United States Patent [19]
Upmeier

[11] 3,930,781
[45] Jan. 6, 1976

[54] POST-COOLING APPARATUS FOR BLOWN THERMOPLASTIC FILM

[75] Inventor: Hartmut Upmeier, Lengerich of Westphalia, Germany

[73] Assignee: Windmöller & Hölscher, Lengerich of Westphalia, Germany

[22] Filed: Nov. 14, 1974

[21] Appl. No.: 523,923

[30] Foreign Application Priority Data
Nov. 15, 1973 Germany............................ 2357138

[52] U.S. Cl. .................. 425/326; 425/72; 425/445
[51] Int. Cl.² ......................................... B29D 7/22
[58] Field of Search ............ 425/72, 326, 376, 378, 425/445

[56] References Cited
UNITED STATES PATENTS

| | | | |
|---|---|---|---|
| 3,355,770 | 12/1967 | Augustin | 425/326 R |
| 3,596,321 | 8/1971 | Upmeier | 425/326 R X |
| 3,726,743 | 4/1973 | Reifenhauser et al. | 425/326 R X |
| 3,749,540 | 7/1973 | Upmeier | 425/326 R |
| 3,775,523 | 11/1973 | Haley | 425/326 R X |
| 3,804,571 | 4/1974 | Upmeier | 425/326 R |
| 3,804,572 | 4/1974 | Upmeier | 425/326 R |
| 3,867,083 | 2/1975 | Herrington | 425/326 R |

*Primary Examiner*—J. Howard Flint, Jr.
*Attorney, Agent, or Firm*—Fleit & Jacobson

[57] ABSTRACT

Apparatus for air-cooling blown tubular thermoplastic film downstream of a position where the film has already solidified comprises a ring having air outlets directed onto the tubular film, the ring comprising a plurality of blow pipes which are pivotally interconnected in pairs at adjacent ends and hinged at their other ends to holding elements which are radially adjustable with respect to the tubular film. The hinge axes at the holding elements are disposed so that the blow pipes form a uniform polygon and the lengths of the individual pipes is such that, when the holding elements are at their radially outermost adjustment, the pipes extend in an obtuse angled zig-zag line circumferentially of the tubular film.

7 Claims, 4 Drawing Figures

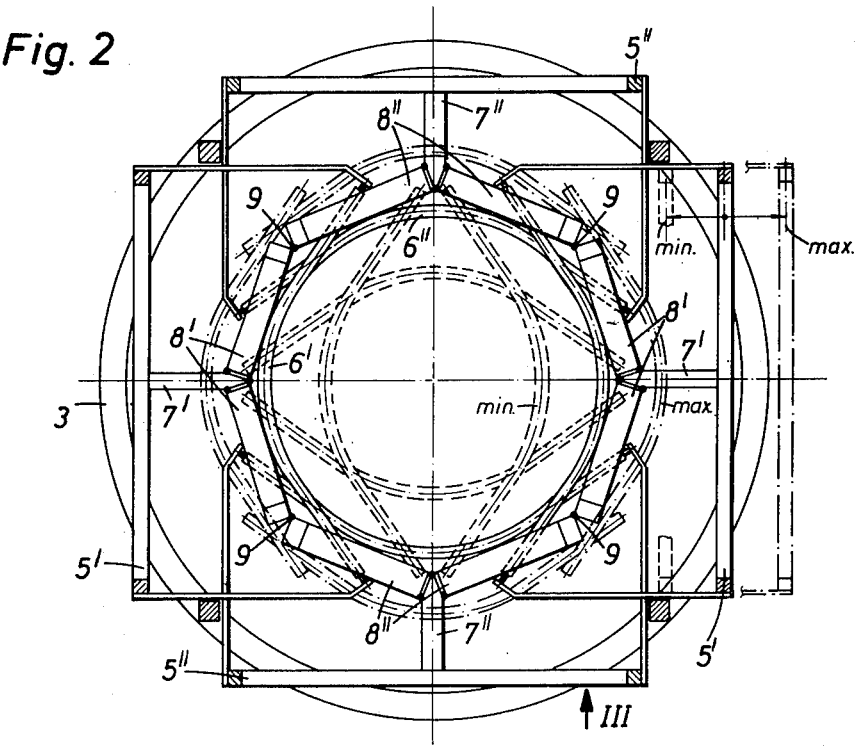
Fig. 2
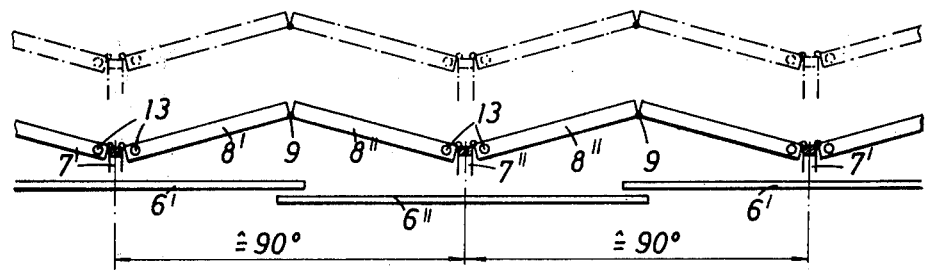
Fig. 3 (max.)
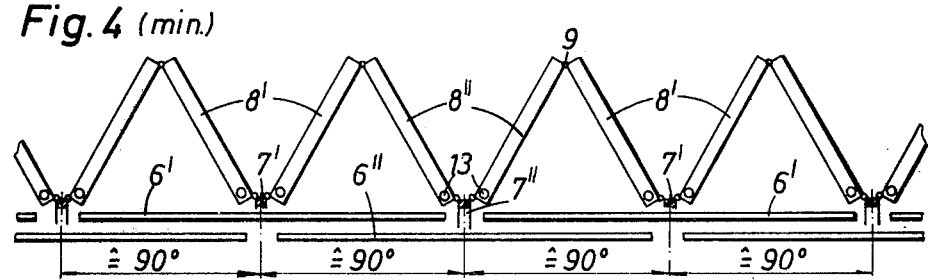
Fig. 4 (min.)

POST-COOLING APPARATUS FOR BLOWN THERMOPLASTIC FILM

The invention relates to a post-cooling apparatus for blown film of thermoplastic material comprising at least one cooling air ring surrounding the tubular film downstream of the solidification line of the film, the ring having air outlets directed onto the tube.

In the manufacture of tubular film in extruder-film blowing installations, ever increasing outputs have been achieved in the course of development. These higher outputs required increasingly better film-cooling apparatuses so that the temperature of the tubular film would not exceed an allowable maximum in the vicinity of the flattening and take-off apparatus. On the other hand, considerable disadvantages were to be expected in subsequent processing, for example blocking of the film or damage of the marginal folds by so-called fold fracture.

In film-cooling apparatuses, a distinction is to be drawn between the so-called main cooling for the still plastic region between the film blowhead and the film solidification line and the post-cooling apparatus which has to cool the already solidified film to an acceptable extent. For the latter purpose it is known to cool the tubular film with the aid of cooling spirals through which cooling water passes or by means of an annular shower with use of a sealing sleeve which collects the cooling water again. The disadvantage here is that such cooling apparatuses can be designed only for one tube diameter and thus when the size is changed the cooling elements have to be replaced.

It is also known to provide in the region of the take-off and flattening apparatus cooling elements through which water flows and which cool the already flattened tube to an acceptable extent. These post-cooling apparatuses can be used for all film widths without reconstruction. A disadvantage with these post-cooling apparatuses is, however, that in the cooling of films with side pleats having side folds introduced in the region of the flattening apparatus the resulting cooling is only uneven because the region of the side folds is practically inaccessible to the cooling elements. Consequently one must still reckon with the known disadvantages such as blocking of the film or fold fracture in the region of the side folds.

It is also known to provide one or more cooling air rings above one another for post-cooling the already solidified tubular film, the rings cooling the tubular film by means of air jets. This post-cooling apparatus is likewise associated with the defect that with a marked change in the film sizes the cooling rings have to be replaced.

The problem of the invention is therefore to provide a post-cooling apparatus which permits uniform cooling of all regions of the tubular film but on the other hand is rapidly adjustable, without the replacement of individual parts, to the new size when the diameter of the blown tube is changed.

In the solution of this problem, the invention is based on the recognition that the cooling effect with air-cooling rings is most marked when the air is led onto the tubular film at high speed along a short distance. According to the invention, to solve the set problem the cooling air ring comprises a plurality of individual blow pipes which are pivotally interconnected in pairs at their adjacent ends and are hinged at their outer ends, about axes perpendicular to the longitudinal axis of the blow pipe, to holding elements that are radially adjustable with respect to the tube axis, the hinge axes on the holding elements being disposed so that the blow pipes form a uniform polygon as viewed longitudinally of the tube, and the length of the individual blow pipes being selected so that, with a radially outermost setting of the holding elements, the pipes extend in an obtuse angled zig-zag line circumferentially of the tube. On a change in diameter of the tubular film, the holding elements can be moved along and will take the blow pipes with them so that their close spacing to the tubular film is maintained and only the angles of the zig-zag line are altered. For each diameter the individual film sections will always be subjected to the same amount of blown cooling air, that is to say with a large tubular film diameter (which generally means that there is a low take-off speed) the cooling air from one of the individual blow pipes is distributed over a larger film periphery, whereas with smaller tubular film diameters (which generally means that there are higher take-off speeds) the cooling air from one individual blow pipe is concentrated on a smaller region of the film periphery.

In a further development of the invention, universal joints can be provided for the pivotal connection of the individual blow pipes and the individual blow pipes of each pair can include the same angle, as viewed lengthwise of the tube, as do each of two individual blow pipes hinged to a holding element. With this preferred embodiment, the corners of the polygon formed by the individual blow pipes are located not only at the holding elements but in each case also at the pivotal joint between two individual blow pipes of a pair. The larger the number of corners of the polygon, the closer will the latter approach the circular cross-section of the tubular film. The universal joints may preferably consist of ball joints.

According to the invention it is also advantageous if the holding elements of the post-cooling apparatus are connected to the radially adjustable holding elements for the supporting and calibrating segments of a steplessly adjustable film calibrating apparatus particularly of the kind described in an older patent of the Applicants. The diameter adjustment is then effected in the same operation for the calibrating segments and for the cooling air ring constructed according to the invention.

In a further embodiment of the invention, each individual blow pipe is connected by an air hose to a compressed air supply conduit which is preferably in the form of an annular channel. The independent supplying of each individual blow pipe with cooling air from the annular channel permits a particularly large throughput of air.

Further, it is possible according to the invention to arrange a plurality of cooling air rings, each comprising individual blow pipes, in superposition so as to increase the cooling effect if this is necessary.

In the following description the invention is explained in more detail with reference to the drawing showing one example. In the drawing FIG. 1 is a diagrammatic representation of a film-blowing installation with a calibrating apparatus and a post-cooling apparatus according to the invention;

FIG. 2 is a section on the line II—II in FIG. 1 looking down on the calibrating apparatus with the individual blow pipes that are connected thereto in a central position;

FIG. 3 is a fragmentary view in the direction of the arrow III in FIG. 2 and in a developed representation, the calibrating and cooling apparatus being in a maximum diameter position, and FIG. 4 is a fragmentary view as in FIG. 3 but with the calibrating and cooling apparatus in a minimum diameter position.

Figure 1:
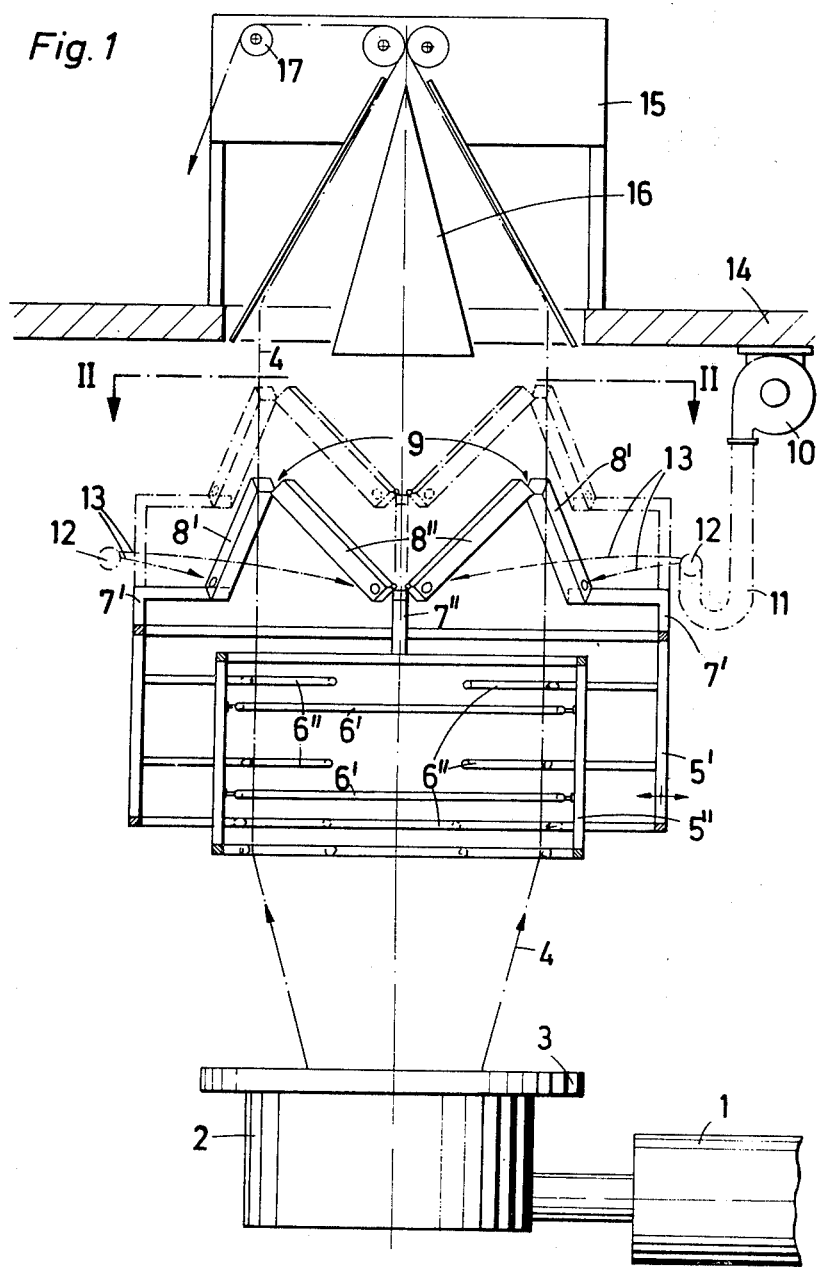

The plastic material melted by the diagrammatically illustrated screw press 1 is formed to tubular film 4 by the film blowhead 2 having the cooling air ring 3. The diagrammatically illustrated calibrating apparatus 5′, 5″ (the holding frame being omitted for the sake of clarity) comprising the supporting and calibrating elements 6′ and 6″ ensures that a uniform diameter is maintained for the tubular film. Mounted on the holding frames 5′, 5″ of the calibrating elements 6′, 6″ are the holders 7′, 7″ to which, in turn, the individual blow pipes 8′ and 8″ are pivotally connected. The individual blow pipes 8′ and 8″ of each pair of blow pipes are interconnected by ball joints 9.

The air supply for the blow pipes 8′ and 8″ is diagrammatically illustrated in the form of the blower 10, the U-shaped hose 11 (to permit height adjustment of the calibrating and post-cooling apparatus), the annular distributing channel 12 and the connecting hoses 13. Each individual blow pipe 8′, 8″ is separably connected to the annular distributing channel 12 by means of a connecting hose 13.

If the cooling effect of one cooling air ring formed of individual blow pipes in accordance with the invention is insufficient, it is readily possible to provide one or more additional rings as indicated in chain-dotted lines in FIG. 1 for the case of one further cooling air ring.

The cooled film 4 is flattened by the flattening and take-off apparatus 15 installed on the platform 14, this apparatus possibly including a side pleating apparatus 16, and is fed over two further guide rolls 17 to a coiler (not shown).

According to the invention, twice the number of individual blow pipes 8′, 8″ than the calibrating and supporting elements 6′, 6″ are so arranged that they form a uniform polygon. In the FIG. 2 example with a four-part calibrating and supporting apparatus, the individual blow pipes 8′, 8″ form a uniform octagon, i.e. the angle between one blow pipe and the next is 45°. Since the pivotal axes of the individual blow pipes 8′, 8″ at the holders 7′, 7″ in each case extend perpendicular to the longitudinal axis of the blow pipe, the angle of 45° from one blow pipe to the next is maintained for each setting of diameter. Since the pivotal axes of the individual blow pipes of each pair at the holders 7′, 7″ are not parallel to one another, in the illustrated embodiment the connecting joints 9 must be in the form of universal joints, preferably ball joints, because with a diameter adjustment the individual blow pipes of each pair are not pivoted relatively to one another in a single plane. In order that the cooling air strikes the film in the same direction in all blow pipe positions, the individual blow pipes are preferably provided with outlet apertures which are directed radially onto the axis of the tubular film.

In a very much simplified diagrammatic form and in a representation that is developed in the plane of the drawing, FIGS. 3 and 4 show in greater detail the position of the blowers for the different diameter settings. FIG. 3 shows the maximum diameter setting at which the ends of the calibrating elements 6′, 6″ just overlap one another, the individual blow pipes 8′ and 8″ extending in a flat zig-zag line. If they were to extend in a straight line in this position, then trouble-free folding together would not be ensured when adjusting in the direction of minimum diameter setting.

FIG. 4 shows the position for minimum tube diameter, at which the ends of the calibrating elements 6′ or 6″ almost touch one another, the individual blow pipes 8′,8″ having been pushed together to form a steep zig-zag line. The interruptions in the cooling air ring at the holding elements 7′, 7″ or at the hinge points 9 have no effect on the uniformity of cooling because an overlap of the individual air streams results from the hinge points of the individual blow pipes 8′ and 8″.

The illustrated embodiment with a four-part calibrating apparatus and an eight-part cooling air ring is only one of several possible embodiments. It is readily possible to extend the described constructional principle to multi-part, for example six-part and eight-part calibrating apparatuses etc., twice the number of individual blow pipes than calibrating elements being provided in each case.

I claim:

1. Post-cooling apparatus for blown thermoplastic film comprising at least one cooling air ring surrounding the tubular film downstream of the solidification line of the film, the ring having air outlets directed onto the tube, characterised in that the cooling air ring comprises a plurality of individual blow pipes (8′, 8″) which are pivotally interconnected in pairs at their adjacent ends and are hinged at their outer ends, about axes perpendicular to the longitudinal axis of the blow pipe, to holding elements (7′, 7″) that are radially adjustable with respect to the tube axis, the hinge axes on the holding elements being disposed so that the blow pipes form a uniform polygon as viewed longitudinally of the tube, and the length of the individual blow pipes being selected so that, with a radially outermost setting of the holding elements, the pipes extend in an obtuse angled zig-zag line circumferentially of the tube.

2. Post-cooling apparatus according to claim 1, characterised in that universal joints (9) are provided for the pivotal connection of the individual blow pipes (8′, 8″) and that the individual blow pipes of each pair include the same angle, as viewed lengthwise of the tube, as do each of two individual blow pipes hinged to a holding element (7′, 7″).

3. Post-cooling apparatus according to claim 2, characterised in that the universal joints (9) comprise ball joints.

4. Post-cooling apparatus according to claim 1, characterised in that the holding elements (7′, 7″) of the post-cooling apparatus are connected to the radially adjustable holding elements (5′, 5″) for the supporting and calibrating segments (6′, 6″) of a steplessly adjustable film calibrating apparatus.

5. Post-cooling apparatus according to claim 1, characterised in that each individual blow pipe (8′, 8″) is connected by an air hose (13) to a compressed air supply conduit (12).

6. Post-cooling apparatus according to claim 5, characterised in that the compressed air supply conduit is in the form of an annular channel (12).

7. Post-cooling apparatus according to claim 1, characterised in that a plurality of cooling air rings, each comprising individual blow pipes (8′, 8″) are arranged in superposition.

* * * * *